United States Patent
Kimura

(10) Patent No.: US 12,487,985 B2
(45) Date of Patent: Dec. 2, 2025

(54) DATA PROCESSING APPARATUS, DATA PROCESSING METHOD, AND RECORDING MEDIUM

(71) Applicant: Yokogawa Electric Corporation, Tokyo (JP)

(72) Inventor: Ryosuke Kimura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 18/168,572

(22) Filed: Feb. 14, 2023

(65) Prior Publication Data
US 2023/0350875 A1    Nov. 2, 2023

(30) Foreign Application Priority Data

Mar. 30, 2022    (JP) .................. 2022-057330

(51) Int. Cl.
| | | |
|---|---|---|
| *G06F 7/00* | (2006.01) | |
| *G05B 23/02* | (2006.01) | |
| *G06F 16/23* | (2019.01) | |

(52) U.S. Cl.
CPC ..... *G06F 16/2365* (2019.01); *G05B 23/0229* (2013.01)

(58) Field of Classification Search
CPC ............ G06F 16/2365; G05B 23/0229; G05B 23/0221; G05B 23/0283; G05B 19/042
See application file for complete search history.

(56) References Cited

U.S. PATENT DOCUMENTS 4,730,214 A * 3/1988 Lambert .................. H04N 5/87
386/230
4,730,314 A * 3/1988 Noguchi ............ G01R 31/3177
714/724

(Continued)

FOREIGN PATENT DOCUMENTS

| JP | H1195833 A | 4/1999 |
| JP | 2013061695 A | 4/2013 |

(Continued)

OTHER PUBLICATIONS

Masashi Oku, et al., Standardization Educational Program, Individual Technology Field—Electric/Electronic Field, Ch. 15: Reliability of Measurement Instruments and Uncertainty of Measurements, [online], Feb. 13, 2009, Japanese Standards Association, [searched on Mar. 22, 2022], Internet, <URL: https://www.jsa.or.jp/datas/media/10000/md_2469.pdf>.

(Continued)

*Primary Examiner* — Mohammed R Uddin

(57) ABSTRACT

(SOLUTION) Provided is a data processing apparatus including: a data acquisition unit for acquiring time-series data regarding running of an apparatus; a stop acquisition unit for acquiring a stop of the running of the apparatus; and a correction unit for correcting, after changing a reference value according to an amount of variation in the data between before and after a stop period of the apparatus, the data using the value. Provided is a data processing apparatus including: a data acquisition unit for acquiring time-series data regarding running of an apparatus; a stop acquisition unit for acquiring a stop of the running of the apparatus; an output unit for outputting an amount of variation in the data between before and after a stop period of the apparatus; and a correction unit for correcting, after changing a reference (Continued)

value upon receiving an instruction corresponding to the output, the data using the value.

18 Claims, 10 Drawing Sheets

(56) References Cited

U.S. PATENT DOCUMENTS

| | | | | |
|---|---|---|---|---|
| 6,591,201 | B1* | 7/2003 | Hyde | G01F 25/10 |
| | | | | 700/282 |
| 2005/0021245 | A1* | 1/2005 | Furuno | E02F 9/2292 |
| | | | | 702/33 |
| 2005/0048337 | A1* | 3/2005 | Matsubayashi | H01M 8/04955 |
| | | | | 429/430 |
| 2007/0215574 | A1* | 9/2007 | Tanaka | G05B 13/026 |
| | | | | 216/60 |
| 2009/0033993 | A1* | 2/2009 | Nakazato | G06F 3/1286 |
| | | | | 358/1.15 |
| 2009/0248282 | A1* | 10/2009 | Adachi | F02N 11/0818 |
| | | | | 701/112 |
| 2010/0036631 | A1* | 2/2010 | Atoro | G01R 13/029 |
| | | | | 702/67 |
| 2012/0004890 | A1* | 1/2012 | Chen | G05B 19/4184 |
| | | | | 702/181 |
| 2016/0143544 | A1* | 5/2016 | Tanaka | A61B 5/1118 |
| | | | | 600/479 |
| 2017/0260968 | A1* | 9/2017 | Tsutsui | F03D 17/00 |
| 2017/0297199 | A1* | 10/2017 | Suzuki | G01M 13/021 |
| 2018/0284707 | A1* | 10/2018 | Menon | G05B 19/042 |
| 2019/0301979 | A1 | 10/2019 | Kawanoue | |
| 2019/0339680 | A1* | 11/2019 | Aota | G06F 16/2358 |
| 2020/0089207 | A1* | 3/2020 | Unuma | G05B 23/0283 |
| 2020/0198128 | A1 | 6/2020 | Hatanaka | |
| 2021/0181732 | A1 | 6/2021 | Sadazuka | |
| 2021/0183528 | A1* | 6/2021 | Maya | G16Y 40/40 |
| 2022/0141556 | A1* | 5/2022 | Sugata | H04Q 9/04 |
| | | | | 340/870.11 |
| 2022/0365526 | A1* | 11/2022 | Ishikawa | G05B 23/0283 |
| 2023/0120046 | A1 | 4/2023 | Ishida | |
| 2023/0366708 | A1* | 11/2023 | Lin | G05B 23/024 |

FOREIGN PATENT DOCUMENTS

| | | |
|---|---|---|
| JP | 2015108886 A | 6/2015 |
| JP | 2015230576 A | 12/2015 |
| JP | 2019179395 A | 10/2019 |
| JP | 2019220226 A | 12/2019 |
| JP | 6949275 B1 | 10/2021 |
| JP | 7021976 B2 | 2/2022 |
| WO | 2012073289 A1 | 6/2012 |

OTHER PUBLICATIONS

Extended European Search Report for counterpart European Application No. 23160987.6, issued by the European Patent Office on Sep. 1, 2023.

Office Action issued for counterpart Japanese Application No. 2022-057330, transmitted from the Japanese Patent Office on Dec. 19, 2023 (drafted on Dec. 12, 2023).

Office Action issued for counterpart Japanese Application No. 2022-057330, transmitted from the Japanese Patent Office on May 28, 2024 (drafted on May 20, 2024).

* cited by examiner

| No. | STOP PERIOD | DIFFERENCE |
|---|---|---|
| 1 | 5 AM ON JANUARY 24 TO 4 AM ON JANUARY 26 | 1.61 |
| 2 | 11 AM ON JANUARY 6 TO 10 AM ON JANUARY 8 | 1.46 |
| 3 | 11 AM ON JANUARY 16 TO 10 AM ON JANUARY 18 | 0.36 |
| 4 | 7 AM ON JANUARY 31 TO 6 AM ON FEBRUARY 1 | 0.17 |
| 5 | 12 AM ON JANUARY 13 TO 12 PM ON JANUARY 13 | 0.03 |
| 6 | 12 AM ON FEBRUARY 6 TO 11 PM ON FEBRUARY 6 | 0.01 |

*FIG.7*

DATA PROCESSING APPARATUS, DATA PROCESSING METHOD, AND RECORDING MEDIUM

The contents of the following Japanese patent application(s) are incorporated herein by reference:
NO. 2022-057330 filed in JP on Mar. 30, 2022.

BACKGROUND

1. Technical Field

The present invention relates to a data processing apparatus, a data processing method, and a recording medium.

2. Related Art

Non-Patent Document 1 describes that "calibration is a series of tasks for determining a relationship between a value indicated by a measuring gauge or a measurement system or a value expressed by a material measure or a reference material and a value realized by standards".

PRIOR ART DOCUMENT

Non-Patent Document

Non-Patent Document 1: Masashi Oku, et al., Standardization Educational Program, Individual Technology Field-Electric/Electronic Field, Ch. 15: Reliability of Measurement Instruments and Uncertainty of Measurements, [online], Feb. 13, 2009, Japanese Standards Association, [searched on Mar. 22, 2022], Internet <URL: https://www.jsa.or.jp/datas/media/10000/md_2469.pdf>

BRIEF DESCRIPTION OF THE DRAWINGS

FIG. 7 shows an example of a display screen that an output unit 280 causes a display apparatus 300 to display.

DESCRIPTION OF EXEMPLARY EMBODIMENTS

Hereinafter, embodiments of the present invention will be described. The embodiments do not limit the invention according to the claims. In addition, not all of the combinations of features described in the embodiments are essential to the solution of the invention.

Figure 9:
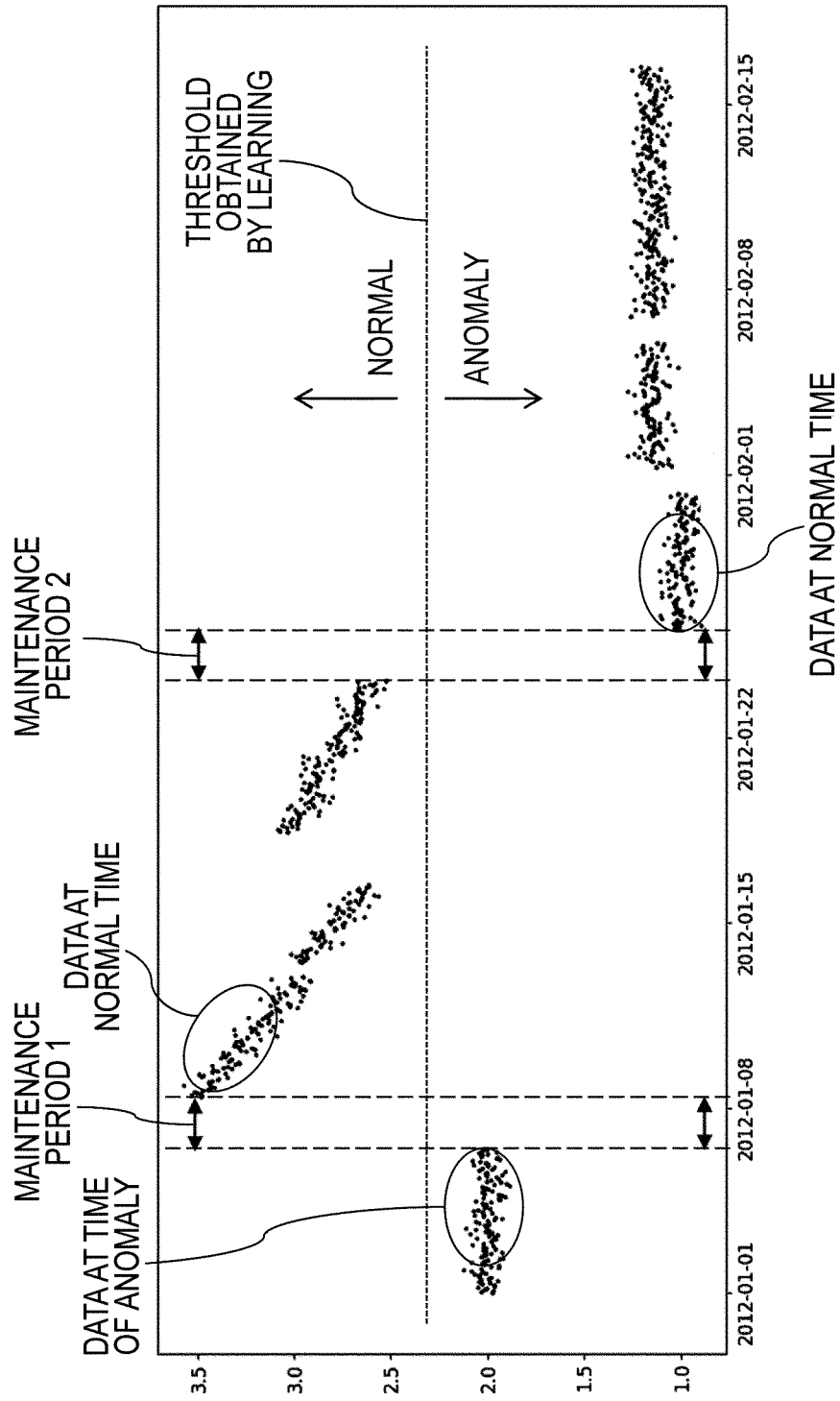
FIG. 9 shows an example of time-series data representing a pressure of a particular apparatus in a plant.

FIG. 9 shows time-series data representing a pressure of a particular apparatus in a plant. A horizontal axis represents a date, and a vertical axis represents a pressure. In FIG. 9, data shows that the apparatus is anomalous before a first maintenance period 1, and shows that the apparatus is set back to normal by a maintenance after the maintenance period 1. However, the data shows that, after a maintenance period 2, the apparatus which is actually normal owing to the maintenance is anomalous similar to the data before the maintenance period 1. Such a variation in the data between before and after the maintenance period 2 is caused by a variation of a detection value that is due to a deviation of an apparatus or a sensor caused by the maintenance, or the like, and thus the data incorrectly shows a state of the apparatus. When such data is used as it is for machine learning processing, an incorrect threshold is obtained as in FIG. 9 to result in a learning model which incorrectly recognizes the state of the apparatus.

Figure 1:
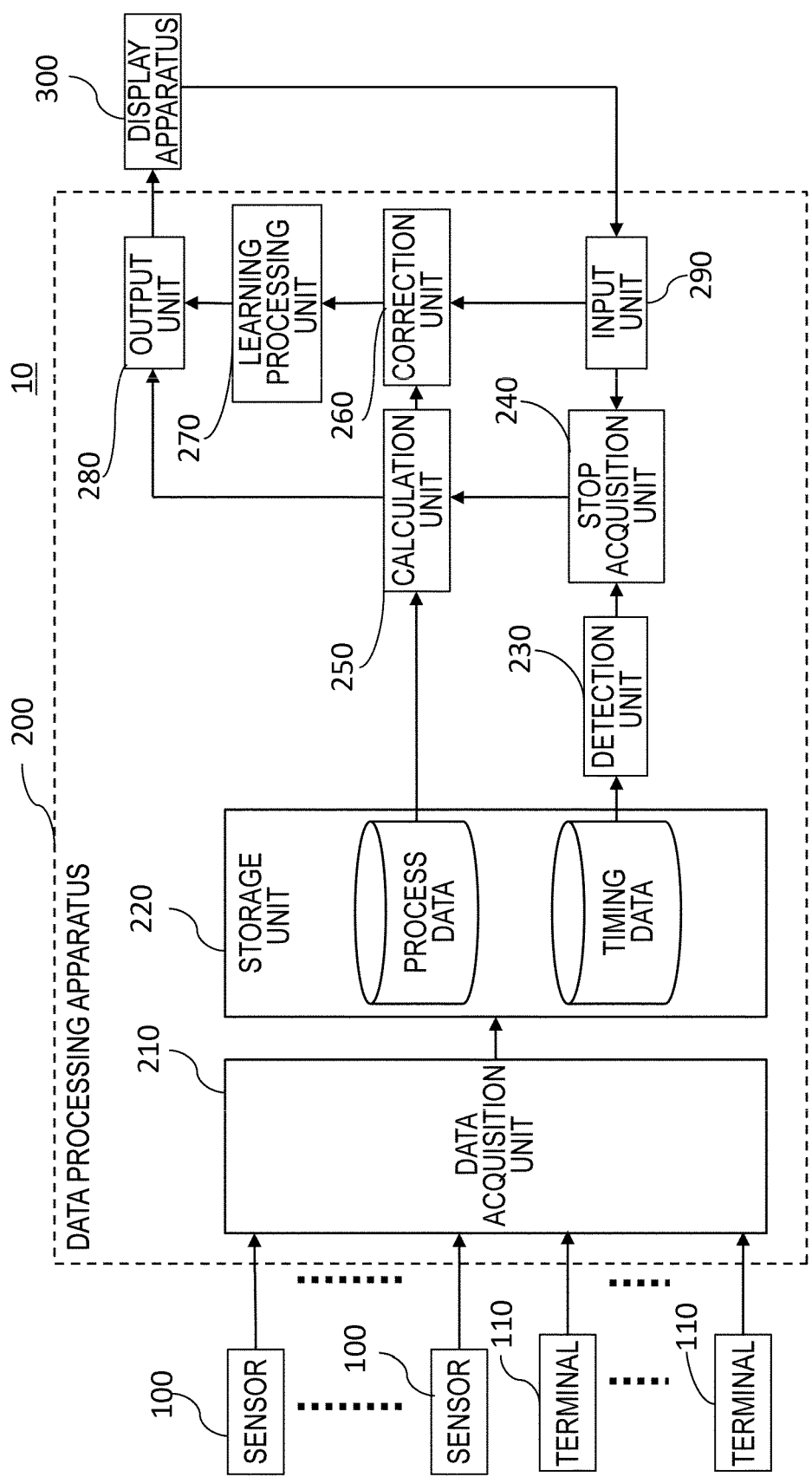
FIG. 1 shows a management system according to the present embodiment.

FIG. 1 shows a management system 10 according to the present embodiment. As an example, the management system 10 performs maintenance and management of a plant and includes a plurality of sensors 100, a plurality of terminals 110, a data processing apparatus 200, and a display apparatus 300.

Herein, examples of the plant include: in addition to an industrial plant such as a chemical plant, a plant for managing and controlling a well site such as a gas field or an oil field and its surrounding area; a plant for managing and controlling power generation such as hydroelectric, thermal, or nuclear power generation; a plant for managing and controlling energy harvesting from solar power, wind power, or the like; a plant for managing and controlling water and sewerage, dams, or the like; and others. As an example, the plurality of sensors 100 and the terminals 110 may be arranged at a site where a process is executed in a plant. As an example, the data processing apparatus 200 and the display apparatus 300 may be arranged in a management center of the plant.

The plurality of sensors 100 may each be a sensor 100 that is connected to the data processing apparatus 200 and measures a physical quantity such as a pressure, a temperature, pH, a speed, and a flow rate in the process of the plant, or may be a microphone that collects odd noises and the like in the plant or position detection equipment that outputs position information of each equipment. The plurality of sensors 100 may be different types of sensors, or at least two sensors 100 as a part of the plurality of sensors 100 may be of the same type.

The plurality of terminals 110 are connected to the data processing apparatus 200 and access setting parameters of equipment in the plant in response to inputs of workers at the site to reference, set, and change the values of the setting parameters, and the like. The terminal 110 may be a stationary PC (personal computer) or may be a handheld terminal (HHT) carried by the worker (as an example, smartphone or tablet PC).

The data processing apparatus 200 is connected to the display apparatus 300, corrects data acquired from the plurality of terminals 110, the plurality of sensors 100, and the like for learning processing, and causes the display apparatus 300 to display a processing result. At this time, the data processing apparatus 200 performs correction of data corresponding to a variation of data due to a stop of equipment during a maintenance or the like.

The data processing apparatus 200 may be a computer such as a PC, a tablet PC, a smartphone, a work station, a server computer, or a general-purpose computer, or may be a computer system in which a plurality of computers are connected. Such a computer system is also a computer in a broad sense. Moreover, the data processing apparatus 200 may be implemented by one or more virtual computer environments executable in a computer. Alternatively, the data processing apparatus 200 may be a dedicated computer designed for maintenance and management of a plant, or may be dedicated hardware realized by a dedicated circuit. Alternatively, the data processing apparatus 200 may be realized by cloud computing.

The data processing apparatus 200 includes a data acquisition unit 210, a storage unit 220, a detection unit 230, a stop acquisition unit 240, a calculation unit 250, a correction unit 260, a learning processing unit 270, an output unit 280, and an input unit 290.

The data acquisition unit 210 is connected to the plurality of sensors 100, the plurality of terminals 110, and the storage unit 220, and acquires time-series data related to running of an apparatus from the plurality of sensors 100 and the plurality of terminals 110. The data acquisition unit 210 may store the acquired data in the storage unit 220.

Herein, the apparatus for which time-series data is acquired may be equipment in a plant and may be, for example, an actuator that controls a physical quantity including a pressure, a temperature, pH, a speed, a flow rate, and the like in a process in a plant, such as a valve, a flow control valve, an on-off valve, a pump, a fan, a motor, a heating apparatus, and a cooling apparatus, may be piping through which a fluid flows, may be a switch, a camera, a PC, or the like arranged in a room in a management center or the like, or may be other equipment.

The time-series data related to the running of the apparatus may be data used in controlling the running of the equipment in the plant, may be a detection result detected by the plurality of sensors 100, or may be input data of workers input to the plurality of terminals 110 or setting values of the equipment. The data acquired by the data acquisition unit 210 may include process data to be corrected in the data processing apparatus 200 and stop detection data used for acquiring a stop of the apparatus by the stop acquisition unit 240.

The storage unit 220 is connected to the detection unit 230 and the calculation unit 250 and stores data acquired by the data acquisition unit 210. The storage unit 220 may supply the stop detection data to the detection unit 230 and supply the process data to the calculation unit 250.

The detection unit 230 may be connected to the stop acquisition unit 240 and detect a stop of the running of the apparatus. Based on the stop detection data acquired by the data acquisition unit 210, the detection unit 230 may detect a stop of the running of the apparatus.

The stop acquisition unit 240 is connected to the calculation unit 250 and acquires the stop of the running of the apparatus. The stop acquisition unit 240 may acquire a date and time on/at which the apparatus is stopped and a date and time right before the apparatus is operated, that have been detected by the detection unit 230, and supply data representing the stop date and time and the date and time right before the start of the operation (that is, a stop period) to the calculation unit 250.

The calculation unit 250 is connected to the output unit 280 and the correction unit 260 and calculates, based on the process data acquired by the data acquisition unit 210 and the stop of the apparatus acquired by the stop acquisition unit 240, an amount of variation in the process data between before and after the stop period of the apparatus. The calculation unit 250 may calculate an amount of variation in an average value of process data between before and after the stop period of the apparatus. The average value of data before (or after) the stop period of the apparatus may be an average value of a part of process data during an operation period right before (or right after) the stop period out of the operation periods of the apparatus before (or after) the stop period. The calculation unit 250 may supply the calculated amount of variation to the output unit 280 and the correction unit 260.

The correction unit 260 is connected to the learning processing unit 270, and using a value of the process data right after the running of the apparatus is stopped as a reference, corrects a value of each process data after the stop. The correction unit 260 may supply the corrected process data to the learning processing unit 270.

The learning processing unit 270 is connected to the output unit 280 and uses the corrected process data from the correction unit 260 to perform learning processing of a machine learning model for detecting whether there is an anomaly in the process data. The learning processing unit 270 may use the corrected process data to generate and update the machine learning model. The learning processing unit 270 may apply the corrected process data to the machine learning model to thus detect whether there is an anomaly in the process data. The learning processing unit 270 may supply a result of the learning processing to the output unit 280.

The output unit 280 is connected to the display apparatus 300 and outputs the amount of variation in data between before and after the stop period of the apparatus. The output unit 280 may cause the display apparatus 300 to display the amount of variation in the data between before and after the stop period of the apparatus.

The input unit 290 is connected to the display apparatus 300, the correction unit 260, and the stop acquisition unit 240, and receives an instruction corresponding to the output of the amount of variation in the data. Upon receiving an instruction from a user of the display apparatus 300, the input unit 290 may supply the instruction to the correction unit 260 or the stop acquisition unit 240.

The display apparatus 300 may be a display connected to the data processing apparatus 200 in a wired or wireless manner, and may be a display screen of a computer such as a PC, a tablet PC, a smartphone, a work station, a server computer, or a general-purpose computer.

Figure 2:
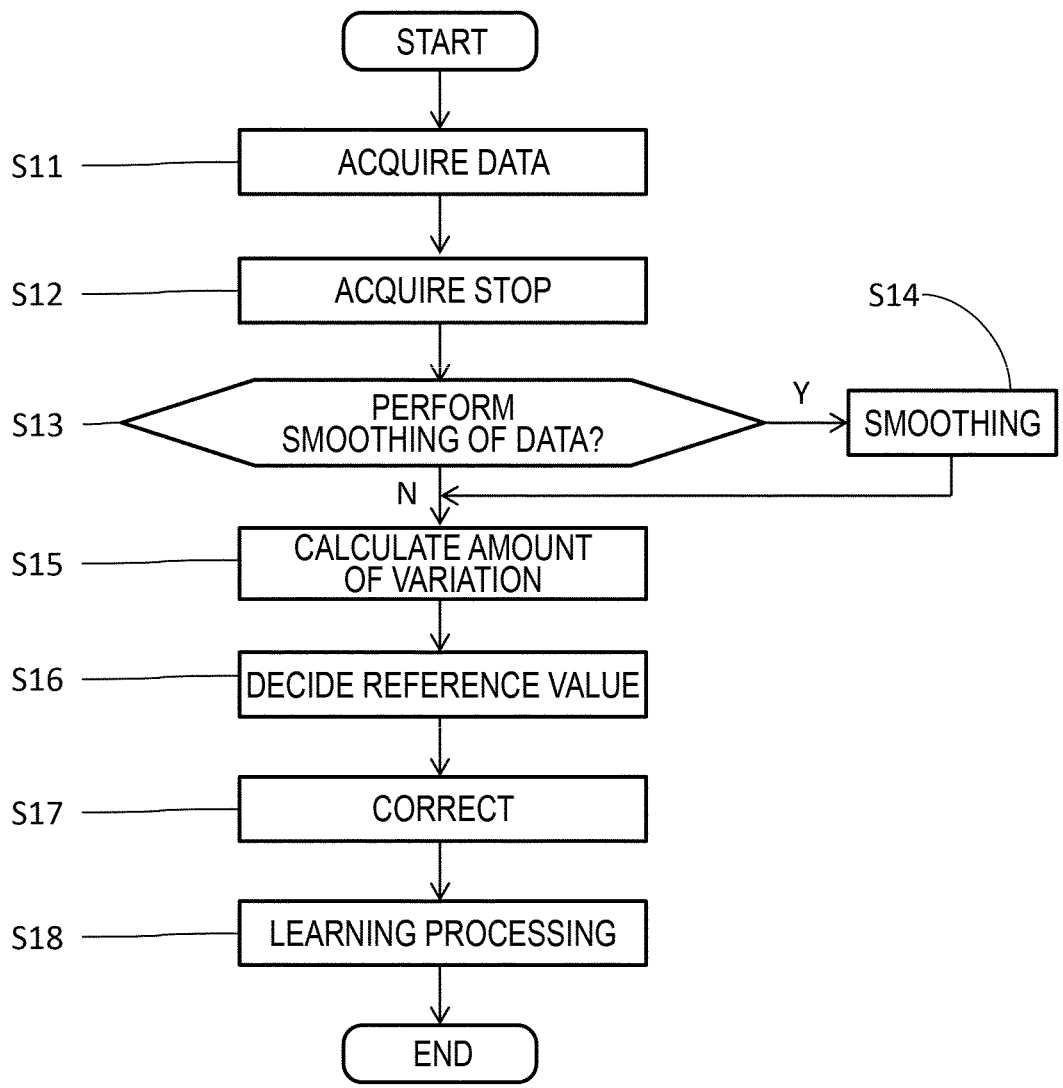
FIG. 2 shows an example of a processing flow of a data processing apparatus 200 according to the present embodiment.

FIG. 2 shows an example of a processing flow of the data processing apparatus 200 according to the present embodiment. Steps S11 to S18 show an operation of generating a machine learning model in the data processing apparatus 200. It is to be noted that this operation may be started in response to an instruction input of the user to the data processing apparatus 200. The instruction input of the user may include at least one of an input of an identifier (an apparatus name, an identification number, and the like) for specifying a learning processing target apparatus or a detection period of processing target data.

In Step S11, the data acquisition unit 210 may acquire data from the plurality of sensors 100 and the plurality of terminals 110 in real time or periodically, and store the data in the storage unit 220. As an example, the data acquisition unit 210 may acquire, from the plurality of sensors 100, process data representing a pressure of particular equipment in the plant and stop detection data representing the number of rotations of an engine for operating the particular equipment. The data acquisition unit 210 may store the acquired data in the storage unit 220 in association with an identifier of the apparatus and a detected date and time. The storage unit 220 may supply the process data and the stop detection data corresponding to the instruction input of the user to the detection unit 230 and the calculation unit 250.

In Step S12, the data processing apparatus 200 acquires a stop period (as an example, a date and time on/at which the apparatus is stopped and a date and time right before the apparatus is operated). The data processing apparatus 200 can automatically acquire the stop period. The detection unit 230 may detect the stop of the apparatus when a value of the stop detection data becomes smaller than a threshold. Further, a worker may input stop detection data representing a stop of the apparatus due to a maintenance or the like via the terminal 110, and the detection unit 230 may detect the stop of the apparatus represented by the stop detection data. The detection unit 230 may supply the detected stop period to the stop acquisition unit 240. When a period of the stop of the running of the apparatus detected by the detection unit 230 exceeds a threshold, the stop acquisition unit 240 may acquire the period of the stop. The stop acquisition unit 240 may supply the acquired stop period to the calculation unit 250.

Further, the data processing apparatus 200 may acquire the stop period based on an input from the user. As an example, the output unit 280 may cause the display apparatus 300 to display the process data or the stop detection data in time series, and the user of the data processing apparatus 200 may decide the stop period from the display of the display apparatus 300 and input the stop period via the input unit 290. The stop acquisition unit 240 may acquire the stop period from the input unit 290 and supply the stop period to the calculation unit 250.

In Step S13, the calculation unit 250 decides whether smoothing processing of the process data received from the storage unit 220 is necessary. The calculation unit 250 may perform the smoothing processing in Step S14 when an indicator indicating a variation of the process data exceeds a threshold, and may advance to next Step S15 when the indicator is smaller than the threshold. Moreover, the output unit 280 may cause the display apparatus 300 to display the process data so that the user decides whether to perform smoothing from the display of the display apparatus 300 and inputs a smoothing processing instruction with respect to the calculation unit 250 via the input unit 290. The calculation unit 250 advances to Step S14 when decided to perform the smoothing processing (Y in FIG. 2), and advances to Step S15 when decided not to perform the smoothing processing (N in FIG. 2).

As an example, in Step S14, the calculation unit 250 may calculate a moving average of the process data to perform the smoothing processing. The calculation unit 250 may calculate the moving average of the process data in each of a plurality of operation sections sectioned by the stop periods supplied from the stop acquisition unit 240.

In Step S15, the calculation unit 250 calculates an amount of variation in the process data between before and after each stop period supplied from the stop acquisition unit 240. When the smoothing processing is performed, the calculation unit 250 may calculate the amount of variation using the process data subjected to the smoothing processing. The calculation unit 250 may calculate an absolute value of a difference between the process data before and after each stop period as the amount of variation, or may calculate an amount of variation in an average value of the process data between before and after each stop period.

The calculation unit 250 may calculate the amount of variation using a part of the process data closest to the stop period out of the process data in the operation periods right before and right after the stop period or an average value of the part of the process data.

Further, the calculation unit 250 may calculate an average value of the process data in a plurality of different ranges both right before and right after the stop period of the apparatus, and calculate an amount of variation in a central value of the plurality of average values of the process data between before and after the stop period of the running of the apparatus. Of a total number of data points in the operation period right before each stop period, the calculation unit 250 may calculate each of the average values of the process data in the plurality of different ranges closest to the stop period. Similarly, of the total number of data points in the operation period right after each stop period, the calculation unit 250 may calculate each of the average values of the process data in the plurality of ranges closest to the stop period. With the total number of data points in a single operation period being 100%, the calculation unit 250 may calculate an average value of process data within a range of 10% or less, that is closest to the stop period in the operation period.

As an example, with the total number of data points in a single operation period being 100%, the calculation unit 250 may calculate six average values from 5%, 6%, 7%, 8%, 9%, and 10% of the process data closest to the stop period in the operation period. The calculation unit 250 may calculate a central value of the six average values, and calculate an absolute value of a difference between the central value of the average values right before the stop period and the central value of the average values right after the stop period. It is to be noted that although the calculation unit 250 calculates the plurality of average values with resolution performance of 1%, the present invention is not limited to this, and the calculation unit 250 may calculate the plurality of average values by resolution performance of 1% or less.

The calculation unit 250 may supply the calculation result and the process data to the correction unit 260. The calculation unit 250 may also supply the calculation result to the output unit 280.

In Step S16, the correction unit 260 uses the calculation result of the calculation unit 250 to decide a plurality of different reference values to be used for correcting the time-series process data. In the time-series process data, the correction unit 260 changes the reference value for the correction in the reference value changing target stop period, and uses the changed reference value until the next reference value changing target stop period. The correction unit 260 may select the reference value changing target stop period out of the plurality of stop periods, and decide the reference value for each of the selected reference value changing target stop periods. First, the correction unit 260 may select at least one of the plurality of stop periods as the reference value changing target stop period. The correction unit 260 changes the reference value for correcting the process data according to the amount of variation in the process data between before and after the stop period of the apparatus. When an amount of variation in process data is larger than a threshold or when the amount of variation in the process data is within an N-th (N is an integer larger than 0) largest out of the amounts of variation in the process data between before and after the plurality of stop periods of the apparatus, the correction unit 260 may select a stop period corresponding to the amount of variation in the process data as the reference value changing target stop period. In this manner, the correction unit 260 can automatically decide the reference value changing target stop period.

Furthermore, the output unit 280 may output the amount of variation in the data between before and after the stop period of the apparatus, and the correction unit 260 may change the reference value for correcting the data upon receiving an instruction corresponding to the output of the amount of variation in the data. The output unit 280 may cause the display apparatus 300 to display the amounts of variation in the data between before and after the plurality of stop periods of the apparatus.

As an example, the output unit 280 may cause the display apparatus 300 to display the plurality of amounts of variation in the data in a ranking format in a descending order or an ascending order. The user of the data processing apparatus 200 may select the reference value changing target stop period according to the display of the display apparatus 300, and input an instruction of the selected stop period to the correction unit 260 via the input unit 290. Then, the correction unit 260 may decide the stop period indicated by the input instruction as the reference value changing target stop period. In this manner, the user can manually decide the reference value changing target stop period.

The correction unit 260 may decide the reference value using initial process data in an operation period right after the reference value changing target stop period. The correction unit 260 may set an average value of the process data right after the reference value changing target stop period or a part of the process data as the reference value for correcting the process data after the stop period. Of the process data of the operation period right after the reference value changing target stop period, the correction unit 260 may set an average value of the plurality of pieces of process data closest to the stop period as the reference value. Further, similar to Step S15, the correction unit 260 may calculate a plurality of average values using process data of a plurality of ranges in the operation period right after the reference value changing target stop period, and set a central value of the plurality of average values as the reference value.

The correction unit 260 may calculate the reference value using the calculation result of the calculation unit 250, or may calculate the reference value from the process data received from the calculation unit 250.

In Step S17, the correction unit 260 calculates a difference between the process data acquired by the data acquisition unit 210 and the reference value to perform the correction. The correction unit 260 may calculate a difference between raw process data or the process data smoothed in Step S14 and the reference value. The correction unit 260 may supply the calculated difference to the learning processing unit 270 as corrected process data.

In Step S18, the learning processing unit 270 uses the process data corrected by the correction unit 260 to generate a machine learning model for detecting whether there is an anomaly in the process data. The learning processing unit 270 may generate a neural network model, a Bayesian network model, or the like.

After generating the machine learning model, the data processing apparatus 200 can subject the acquired data to preprocessing similar to Steps S11 to S17 and apply the data to the machine learning model so as to execute anomaly determination of equipment in the plant. The data processing apparatus 200 may cause the display apparatus 300 to display whether there is an anomaly, an anomaly alert, or the like based on a result of the anomaly determination. Moreover, the data processing apparatus 200 may use the machine learning model to generate and output control data for normally operating the equipment in the plant, and thus control the equipment.

Figure 3:
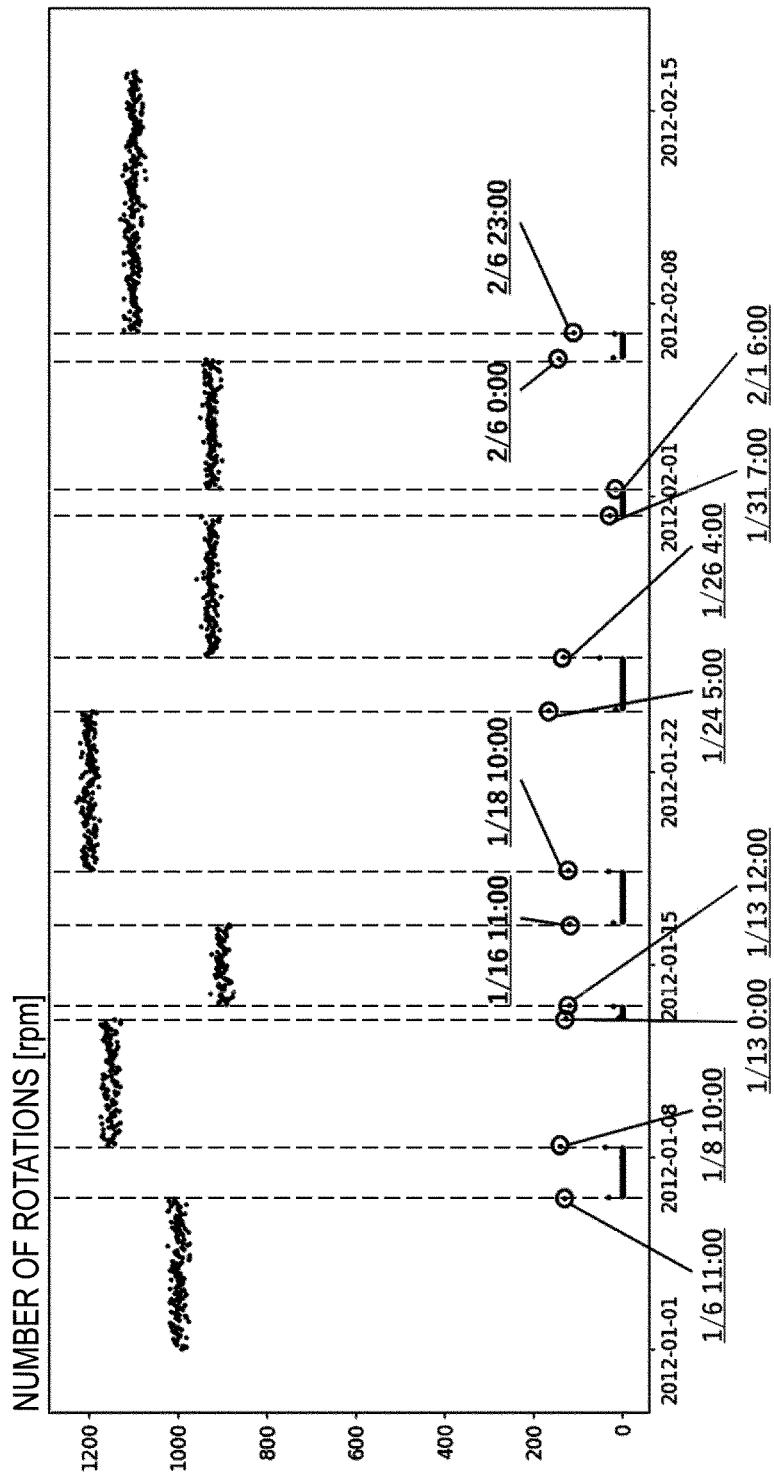
FIG. 3 shows an example of stop detection data.

FIG. 3 shows an example of the stop detection data. The horizontal axis represents a date and time, and the vertical axis represents the number of rotations of an engine of a target apparatus. In FIG. 3, the stop acquisition unit 240 may detect, as the stop period of the apparatus, a period from a date and time on/at which the amount of variation has become smaller than a threshold to a date and time on/at which the amount of variation has exceeded the threshold. As an example, such a threshold may be set to be 150 rpm since the number of rotations is about 1000 rpm during the operation of the apparatus. In FIG. 3, the stop acquisition unit 240 acquires six stop periods, that is, a period from 11 AM on January 6 to 10 AM on January 8, a period from 12 AM on January 13 to 12 PM on January 13, a period from 11 AM on January 16 to 10 AM on January 18, a period from 5 AM on January 24 to 4 AM on January 26, a period from 7 AM on January 31 to 6 AM on February 1, and a period from 12 AM on February 6 to 11 PM on February 6.

Figure 4:
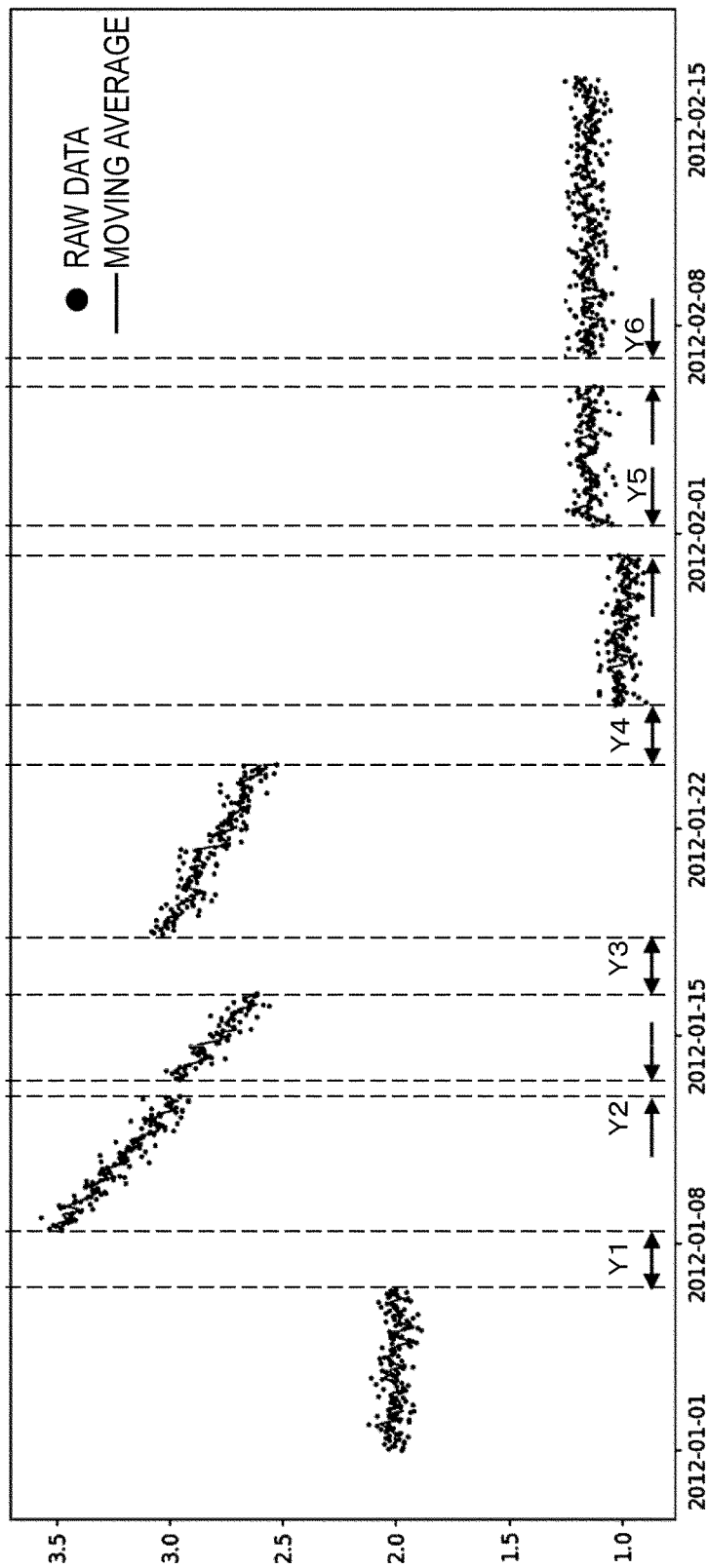
FIG. 4 is an explanatory diagram for describing processing of process data in the data processing apparatus 200.

FIG. 4 is an explanatory diagram for describing the processing of process data in the data processing apparatus 200. The horizontal axis represents a date and time, and the vertical axis represents a pressure acquired from the sensor 100 attached to the target apparatus. Similar to Step S14 in FIG. 2, the calculation unit 250 calculates a moving average of raw data (process data) to perform smoothing. In FIG. 4, the raw data is indicated by a dot, and the moving average is indicated by a solid line. In FIG. 4, regarding the six stop periods acquired by the stop acquisition unit 240, the period from 11 AM on January 6 to 10 AM on January 8 is represented by Y1, the period from 12 AM on January 13 to 12 PM on January 13 is represented by Y2, the period from 11 AM on January 16 to 10 AM on January 18 is represented by Y3, the period from 5 AM on January 24 to 4 AM on January 26 is represented by Y4, the period from 7 AM on January 31 to 6 AM on February 1 is represented by Y5, and the period from 12 AM on February 6 to 11 PM on February 6 is represented by Y6.

Figure 5:
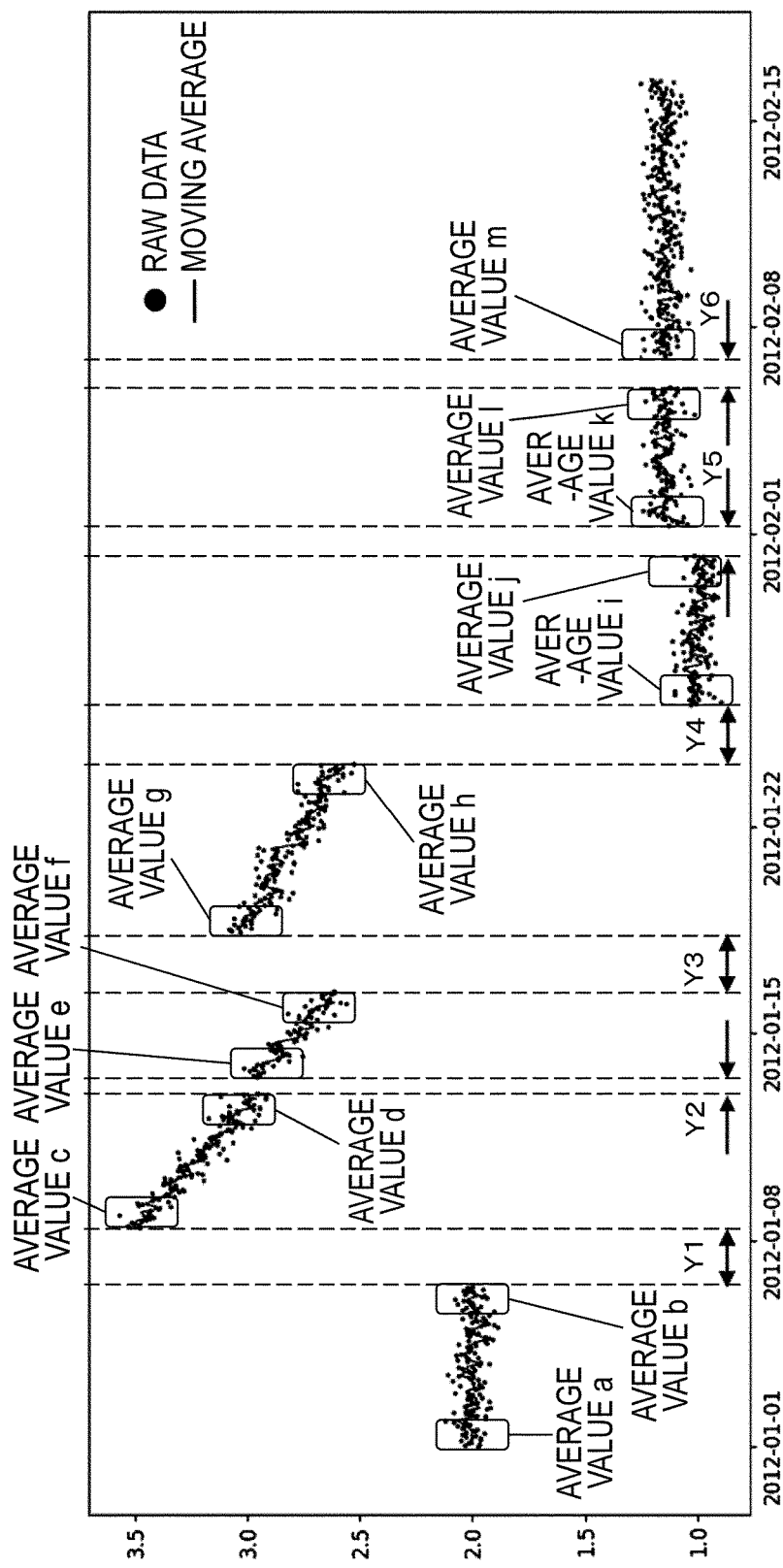
FIG. 5 is an explanatory diagram for describing the processing of process data in the data processing apparatus 200.

FIG. 5 is an explanatory diagram for describing the processing of process data in the data processing apparatus 200. The horizontal axis represents a date and time, and the vertical axis represents a pressure acquired from the sensor 100 attached to the target apparatus. Similar to Step S15 in FIG. 2, for each of the plurality of operation periods sectioned by the stop periods, the calculation unit 250 calculates an average value of initial process data and an average value of process data at a later stage.

An average value a is a central value of the average values of 5%, 6%, 7%, 8%, 9%, and 10% of the process data from a start of detection (an activation of the apparatus) out of 100% of all pieces of process data in the first operation period. An average value b is a central value of the average values of 5%, 6%, 7%, 8%, 9%, and 10% of the process data closest to the stop period Y1 out of 100% of all pieces of process data in an operation period right before the stop period Y1. An average value c is a central value of the average values of 5%, 6%, 7%, 8%, 9%, and 10% of the process data closest to the stop period Y1 out of 100% of all pieces of process data in an operation period right after the stop period Y1. An average value d is a central value of the average values of 5%, 6%, 7%, 8%, 9%, and 10% of the process data closest to the stop period Y2 out of 100% of all pieces of process data in an operation period right before the stop period Y2. An average value e is a central value of the average values of 5%, 6%, 7%, 8%, 9%, and 10% of the process data closest to the stop period Y2 out of 100% of all pieces of process data in an operation period right after the stop period Y2. An average value f is a central value of the average values of 5%, 6%, 7%, 8%, 9%, and 10% of the process data closest to the stop period Y3 out of 100% of all pieces of process data in an operation period right before the stop period Y3. An average value g is a central value of the average values of 5%, 6%, 7%, 8%, 9%, and 10% of the process data closest to the stop period Y3 out of 100% of all pieces of process data in an operation period right after the stop period Y3.

An average value h is a central value of the average values of 5%, 6%, 7%, 8%, 9%, and 10% of the process data closest to the stop period Y4 out of 100% of all pieces of process data in an operation period right before the stop period Y4. An average value i is a central value of the average values of 5%, 6%, 7%, 8%, 9%, and 10% of the process data closest to the stop period Y4 out of 100% of all pieces of process data in an operation period right after the stop period Y4. An average value j is a central value of the average values of 5%, 6%, 7%, 8%, 9%, and 10% of the process data closest to the stop period Y5 out of 100% of all pieces of process data in an operation period right before the stop period Y5. An average value k is a central value of the average values of 5%, 6%, 7%, 8%, 9%, and 10% of the process data closest to the stop period Y5 out of 100% of all pieces of process data in an operation period right after the stop period Y5. An average value I is a central value of the average values of 5%, 6%, 7%, 8%, 9%, and 10% of the process data closest to the stop period Y6 out of 100% of all pieces of process data in an operation period right before the stop period Y6. An average value m is a central value of the average values of 5%, 6%, 7%, 8%, 9%, and 10% of the process data closest to the stop period Y6 out of 100% of all pieces of process data in an operation period right after the stop period Y6.

Figure 6:
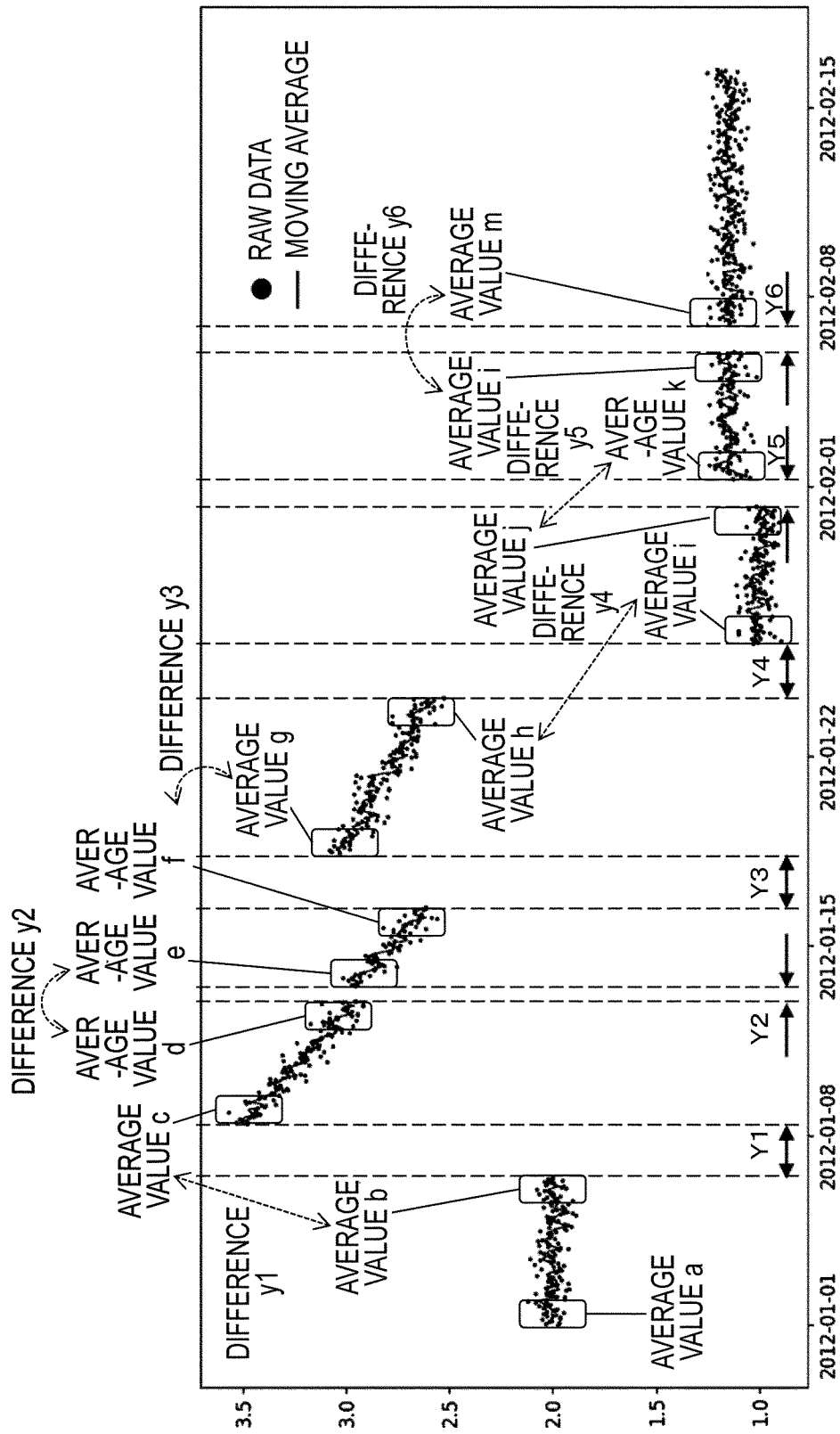
FIG. 6 is an explanatory diagram for describing the processing of process data in the data processing apparatus 200.

FIG. 6 is an explanatory diagram for describing the processing of process data in the data processing apparatus 200. The horizontal axis represents a date and time, and the vertical axis represents a pressure acquired from the sensor 100 attached to the target apparatus. Similar to Step S15 in FIG. 2, the calculation unit 250 calculates a difference between the process data before and after each stop period.

A difference y1 is a difference between the average value b right before the stop period Y1 and the average value c right after the stop period Y1. A difference y2 is a difference between the average value d right before the stop period Y2 and the average value e right after the stop period Y2. A difference y3 is a difference between the average value f right before the stop period Y3 and the average value g right after the stop period Y3. A difference y4 is a difference between the average value h right before the stop period Y4 and the average value i right after the stop period Y4. A difference y5 is a difference between the average value j right before the stop period Y5 and the average value k right after the stop period Y5. A difference y6 is a difference between the average value I right before the stop period Y6 and the average value m right after the stop period Y6.

FIG. 7 shows an example of a display screen that the output unit 280 causes the display apparatus 300 to display. As shown in FIG. 7, the output unit 280 causes the display apparatus 300 to display the amounts of variation calculated by the calculation unit 250 in a ranking format in a descending order. In FIG. 7, the difference indicates an absolute value of the difference between the average values. The user can look at the display screen as shown in FIG. 7 and select the reference value changing target stop period.

Figure 8:
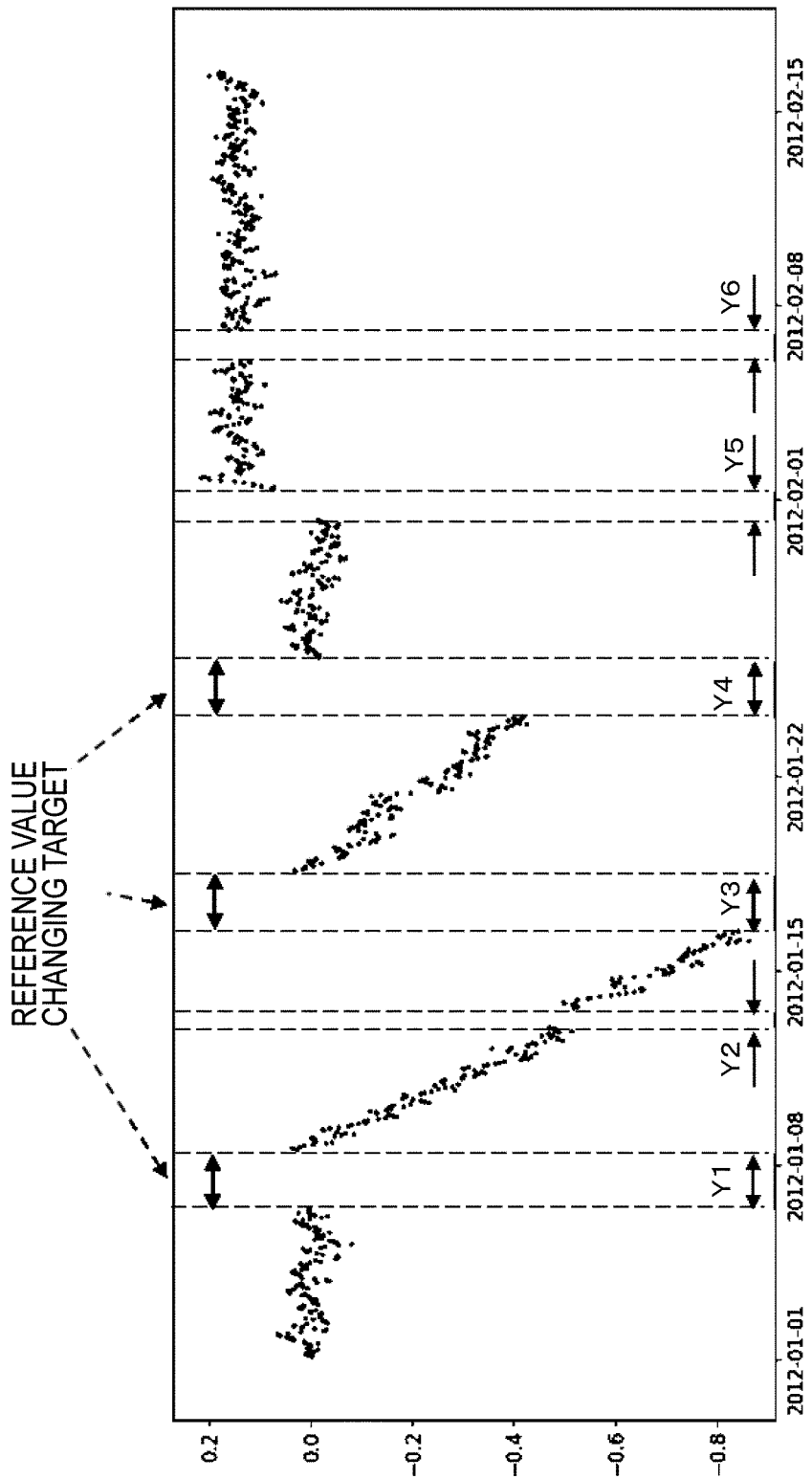
FIG. 8 shows an example of corrected process data.

FIG. 8 shows an example of corrected process data. The correction unit 260 decides the reference value changing target stop periods to be Y1, Y3, and Y4, and performs the correction. The correction unit 260 performs the correction using the average values as shown in FIG. 5, that have been calculated by the calculation unit 250, as the reference values. The correction unit 260 calculates a difference from the average value a for the process data from the start of detection to the stop period Y1, to obtain corrected process data. The correction unit 260 calculates a difference between each process data from the stop period Y1 to the stop period Y3 and the average value c, to obtain corrected data. The correction unit 260 calculates a difference between each process data from the stop period Y3 to the stop period Y4 and the average value g, to obtain corrected process data. The correction unit 260 calculates a difference between each process data subsequent to the stop period Y4 and the average value i, to obtain corrected process data.

As shown in FIG. 8, the data corrected by the data processing apparatus 200 in the present embodiment can be used to efficiently correct a deviation of a detection value of the sensor 100 or the like due to a maintenance or the like. Therefore, the data processing apparatus 200 can use the corrected data in the learning processing to highly accurately predict an anomaly of the apparatus.

It is to be noted that the plurality of thresholds, the value of N in N-th, the range of process data when calculating an average value, and the resolution performance that are used in the data processing apparatus 200 according to the present embodiment may be values preset by the user. Moreover, the data processing apparatus 200 according to the present embodiment is not limited to the use in a plant and is also applicable to a case of acquiring data related to equipment other than that of the plant.

Various embodiments of the present invention may be described with reference to flowcharts and block diagrams whose blocks may represent (1) steps of processes in which operations are performed or (2) sections of apparatuses responsible for performing operations. Certain steps and sections may be implemented by a dedicated circuit, a programmable circuit supplied with computer-readable instructions stored on computer-readable media, and/or processors supplied with computer-readable instructions stored on computer-readable media. The dedicated circuit may include a digital and/or analog hardware circuit, or may include an integrated circuit (IC) and/or a discrete circuit. The programmable circuit may include reconfigurable hardware circuits including logical AND, OR, XOR, NAND, NOR, and other logical operations, flip-flops, registers, memory elements, and the like, such as field-programmable gate arrays (FPGA) and programmable logic arrays (PLA).

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read only memory (ROM), an erasable programmable read only memory (EPROM or Flash memory), an electrically erasable programmable read only memory (EEPROM), a static random access memory (SRAM), a compact disc read only memory (CD-ROM), a digital versatile disk (DVD), a BLU-RAY (registered trademark) disc, a memory stick, an integrated circuit card, and the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general-purpose computer, special-purpose computer, or other programmable data processing apparatuses 200, or to programmable circuit, locally or via a local area network (LAN) or a wide area network (WAN) such as the Internet, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 10:
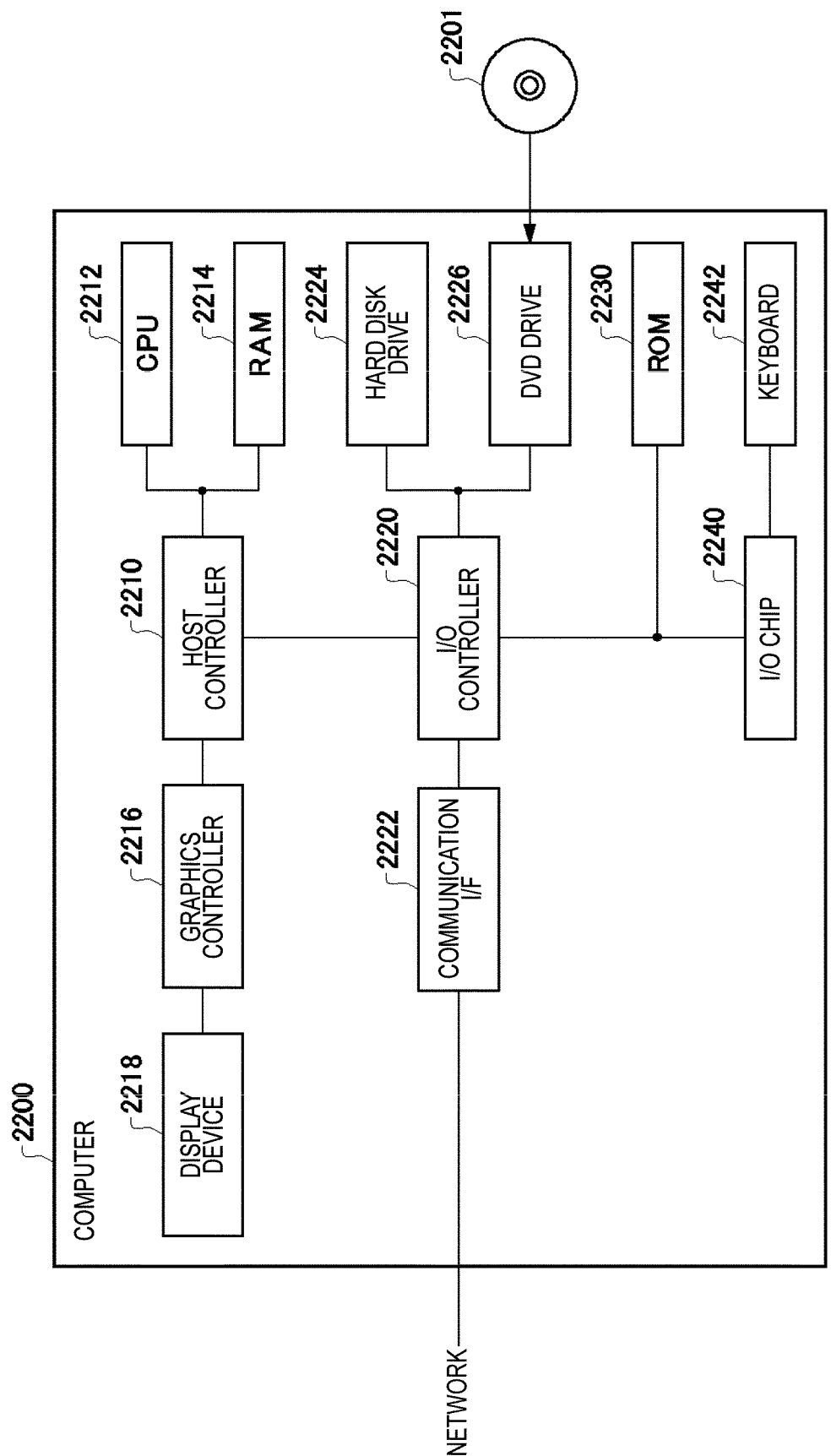
FIG. 10 shows an example of a computer in which a plurality of aspects of the present invention may be entirely or partially embodied.

FIG. 10 shows an example of a computer 2200 in which a plurality of aspects of the present invention may be entirely or partially embodied. A program that is installed in the computer 2200 can cause the computer 2200 to function as or execute operations associated with an apparatus according to the embodiments of the present invention or one or more sections thereof, or execute the operations or the one or more sections, and/or cause the computer 2200 to execute a process according to the embodiments of the present invention or steps of the process. Such a program may be executed by the CPU 2212 to cause the computer 2200 to execute certain operations associated with some or all of the blocks of flowcharts and block diagrams described herein.

The computer 2200 according to the present embodiment includes the CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates in accordance with programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads the programs and data from the IC card, and/or writes the programs and data to the IC card.

The ROM 2230 stores therein a boot program or the like executed by the computer 2200 at the time of activation, and/or a program depending on the hardware of the computer 2200. The input/output chip 2240 may also connect various input/output units to the input/output controller 2220 via a parallel port, a serial port, a keyboard port, a mouse port, and the like.

A program is provided by a computer-readable medium such as the DVD-ROM 2201 or the IC card. The program is read from the computer-readable medium, installed into the hard disk drive 2224, RAM 2214, or ROM 2230, which are also examples of the computer-readable medium, and executed by the CPU 2212. The information processing described in these programs is read by the computer 2200 and provides cooperation between the programs and the various types of hardware resources. An apparatus or method may be constituted by realizing the operation or processing of information in accordance with the usage of the computer 2200.

For example, when communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffer processing region provided in a recording medium such as the RAM 2214, the hard disk drive 2224, the DVD-ROM 2201, or the IC card, and transmits the read transmission data to a network or writes reception data received from a network to a reception buffer processing region or the like provided on the recording medium.

Moreover, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, and the like, and execute various types of processing on the data on the RAM 2214. Next, the CPU 2212 writes back the processed data to the external recording medium.

Various types of programs, data, table and various types of information such as a database may be stored in a recording medium to receive information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, or the like, in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described programs or software module may be stored on the computer 2200 or in the computer-readable medium in the vicinity of the computer 2200. Moreover, a recording medium such as a hard disk or RAM provided in a server system connected to a dedicated communication network or the Internet can be used as the computer-readable medium, thereby providing the program to the computer 2200 via the network.

While the embodiments of the present invention have been described, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

What is claimed is:

1. A data processing apparatus, comprising:
at least one processor;
a data acquisition unit that uses the at least one processor to acquire time-series data related to running of an apparatus;
a stop acquisition unit that uses the at least one processor to acquire a stop of the running of the apparatus;
a calculation unit that uses the at least one processor to calculate an amount of variation by calculating a difference in a value of the data in a period before a stop period and a period after the stop period of the apparatus based on the data acquired by the data acquisition unit and the stop of the running of the apparatus acquired by the stop acquisition unit; and
a correction unit that uses the at least one processor to correct, after changing a reference value according to the amount of variation in the data between before and after the stop period of the apparatus, the data using the reference value; and
the correction unit supplies the calculated difference to the learning processing unit as corrected process data;
a learning processing unit that uses the at least one processor to generate a machine learning model using the data corrected by the correction unit for detecting whether there is an anomaly in the process data;
wherein
the stop period is a maintenance period for the apparatus, and
operations of the apparatus are controlled using control data generated by the machine learning model.

2. The data processing apparatus according to claim 1, further comprising:
a detection unit that uses the at least one processor to detect the stop of the running of the apparatus,
wherein the stop acquisition unit uses the at least one processor to acquire the stop of the running of the apparatus detected by the detection unit.

3. The data processing apparatus according to claim 2, wherein
the detection unit uses the at least one processor to detect the stop of the running of the apparatus based on the data acquired by the data acquisition unit.

4. The data processing apparatus according to claim 3, wherein
when a period of the stop of the running of the apparatus detected by the detection unit exceeds a threshold, the stop acquisition unit uses the at least one processor to acquire the period of the stop.

5. The data processing apparatus according to claim 2, wherein
when a period of the stop of the running of the apparatus detected by the detection unit exceeds a threshold, the stop acquisition unit uses the at least one processor to acquire the period of the stop.

6. The data processing apparatus according to claim 1, wherein
the calculation unit uses the at least one processor to calculate an amount of variation in an average value of the data between before and after the stop period of the apparatus.

7. The data processing apparatus according to claim 1, wherein
the calculation unit uses the at least one processor to calculate an average value of the data in a plurality of different ranges both right before and right after the stop period of the apparatus, and calculate an amount of variation in a central value of a plurality of average values of the data between before and after the stop period of the running of the apparatus.

8. The data processing apparatus according to claim 1, wherein
when the amount of variation in the data is larger than a threshold or the amount of variation in the data is within an N-th largest out of amounts of variation in the data between before and after a plurality of stop periods of the apparatus, the correction unit uses the at least one processor to change the reference value for correcting data after a stop period corresponding to the amount of variation in the data.

9. The data processing apparatus according to claim 1, wherein
the correction unit uses the at least one processor to set an average value of a part of the data right after the stop period of the apparatus as the reference value for correcting the data after the stop period.

10. The data processing apparatus according to claim 1, wherein
the correction unit uses the at least one processor to perform correction by calculating a difference between the data acquired by the data acquisition unit and the reference value.

11. The data processing apparatus according to claim 1, further comprising:
an output unit that uses the at least one processor to output the amount of variation in the data between before and after the stop period of the apparatus.

12. The data processing apparatus according to claim 11, wherein
the output unit uses the at least one processor to cause a display apparatus to display amounts of variation in the data between before and after a plurality of stop periods of the apparatus in a ranking format.

13. A data processing apparatus, comprising:
at least one processor;
a data acquisition unit that uses the at least one processor to acquire time-series data related to running of an apparatus;
a stop acquisition unit that uses the at least one processor to acquire a stop of the running of the apparatus;

a calculation unit that uses the at least one processor to calculate an amount of variation by calculating a difference in a value of the data in a period before a stop period and a period after the stop period of the apparatus based on the data acquired by the data acquisition unit and the stop of the running of the apparatus acquired by the stop acquisition unit;

an output unit that uses the at least one processor to output the amount of variation in the data between before and after the stop period of the apparatus; and a correction unit that uses the at least one processor to correct, after changing a reference value upon receiving an instruction corresponding to the output of the amount of variation in the data, the data using the reference value; and the correction unit supplies the calculated difference to the learning processing unit as corrected process data;

a learning processing unit that uses the at least one processor to generate a machine learning model using the data corrected by the correction unit for detecting whether there is an anomaly in the process data;

wherein the stop period is a maintenance period for the apparatus, and operations of the apparatus are controlled using control data generated by the machine learning model.

14. The data processing apparatus according to claim 13, further comprising:

an input unit that uses the at least one processor to receive the instruction corresponding to the output of the amount of variation in the data.

15. The data processing apparatus according to claim 13, wherein the output unit uses the at least one processor to cause a display apparatus to display amounts of variation in the data between before and after a plurality of stop periods of the apparatus in a ranking format.

16. A data processing method, comprising:

acquiring time-series data related to running of an apparatus;

acquiring a stop of the running of the apparatus;

calculating an amount of variation by calculating a difference in a value of the data in a period before a stop period and a period after the stop period of the apparatus based on the acquired time-series data and the acquired stop of the running of the apparatus;

correcting, after changing a reference value according to an amount of variation in the data between before and after the stop period of the apparatus, the data using the reference value;

supplying the calculated difference as corrected process data; and generating a machine learning model using the data corrected by the correction unit for detecting whether there is an anomaly in the process data;

wherein the stop period is a maintenance period for the apparatus, and operations of an apparatus are controlled using control data generated by the machine learning model.

17. A non-transitory recording medium having recorded thereon a program for causing a computer to function as:

a data acquisition unit configured to acquire time-series data related to running of an apparatus;

a stop acquisition unit configured to acquire a stop of the running of the apparatus;

a calculation unit that uses the at least one processor to calculate an amount of variation by calculating a difference in a value of the data in a period before a stop period and a period after the stop period of the apparatus based on the data acquired by the data acquisition unit and the stop of the running of the apparatus acquired by the stop acquisition unit;

a correction unit configured to correct, after changing a reference value according to the amount of variation in the data between before and after the stop period of the apparatus, the data using the reference value; and the correction unit supplies the calculated difference to the learning processing unit as corrected process data;

a learning processing unit that uses the at least one processor to generate a machine learning model using the data corrected by the correction unit for detecting whether there is an anomaly in the process data;

wherein the stop period is a maintenance period for the apparatus, and operations of the apparatus are controlled using control data generated by the machine learning model.

18. A non-transitory recording medium having recorded thereon a program for causing a computer to function as:

a data acquisition unit configured to acquire time-series data related to running of an apparatus;

a stop acquisition unit configured to acquire a stop of the running of the apparatus;

a calculation unit that uses the at least one processor to calculate an amount of variation by calculating a difference in a value of the data in a period before a stop period and a period after the stop period of the apparatus based on the data acquired by the data acquisition unit and the stop of the running of the apparatus acquired by the stop acquisition unit;

an output unit configured to output the amount of variation in the data between before and after the stop period of the apparatus;

a correction unit configured to correct, after changing a reference value upon receiving an instruction corresponding to the output of the amount of variation in the data, the data using the reference value; and the correction unit supplies the calculated difference to the learning processing unit as corrected process data;

a learning processing unit that uses the at least one processor to generate a machine learning model using the data corrected by the correction unit for detecting whether there is an anomaly in the process data;

wherein the stop period is a maintenance period for the apparatus, and operations of the apparatus are controlled using control data generated by the machine learning model.

\* \* \* \* \*